July 29, 1930.   S. EILENBERG ET AL   1,771,844
PHOTOGRAPHIC APPARATUS
Filed Oct. 11, 1927   4 Sheets-Sheet 1
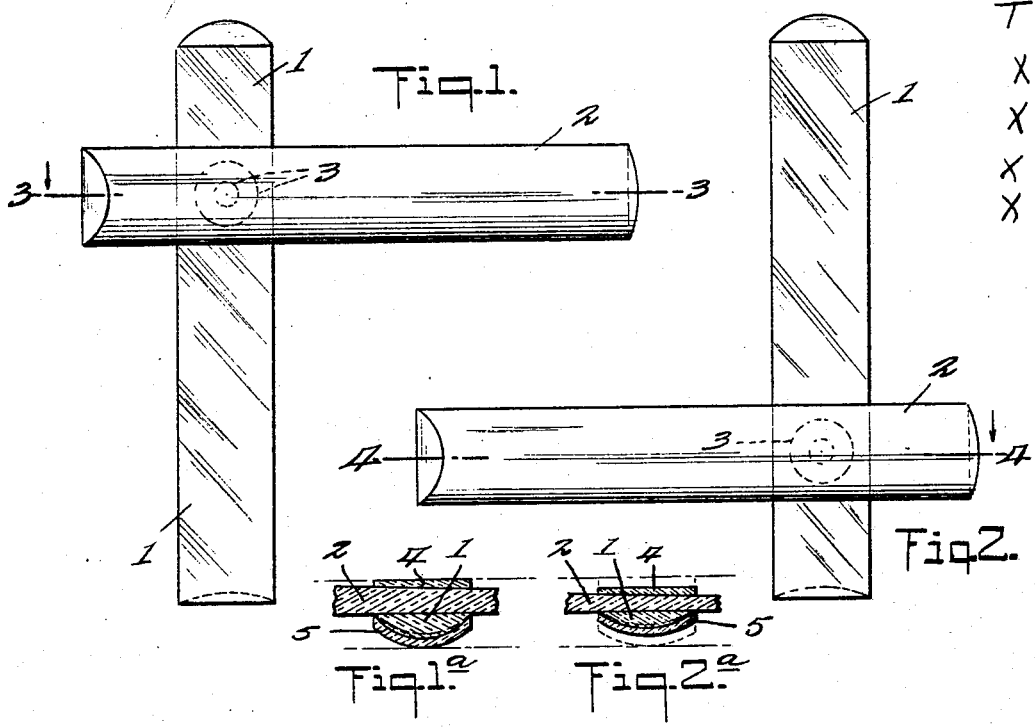
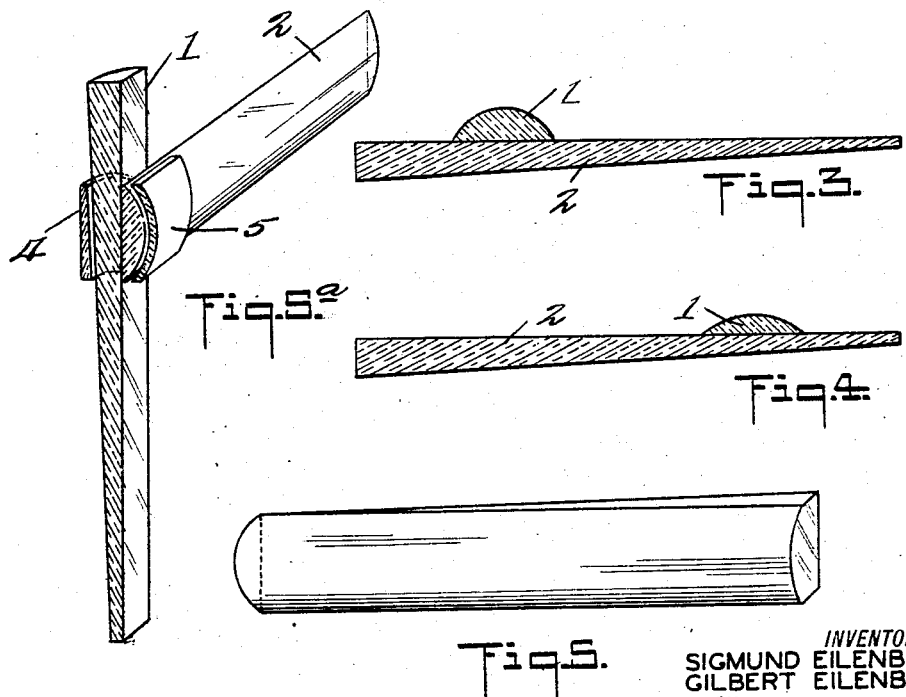
INVENTORS
SIGMUND EILENBERG
GILBERT EILENBERG
BY Marks & Clerk.
ATTORNEY July 29, 1930.  S. EILENBERG ET AL  1,771,844
PHOTOGRAPHIC APPARATUS
Filed Oct. 11, 1927   4 Sheets-Sheet 2
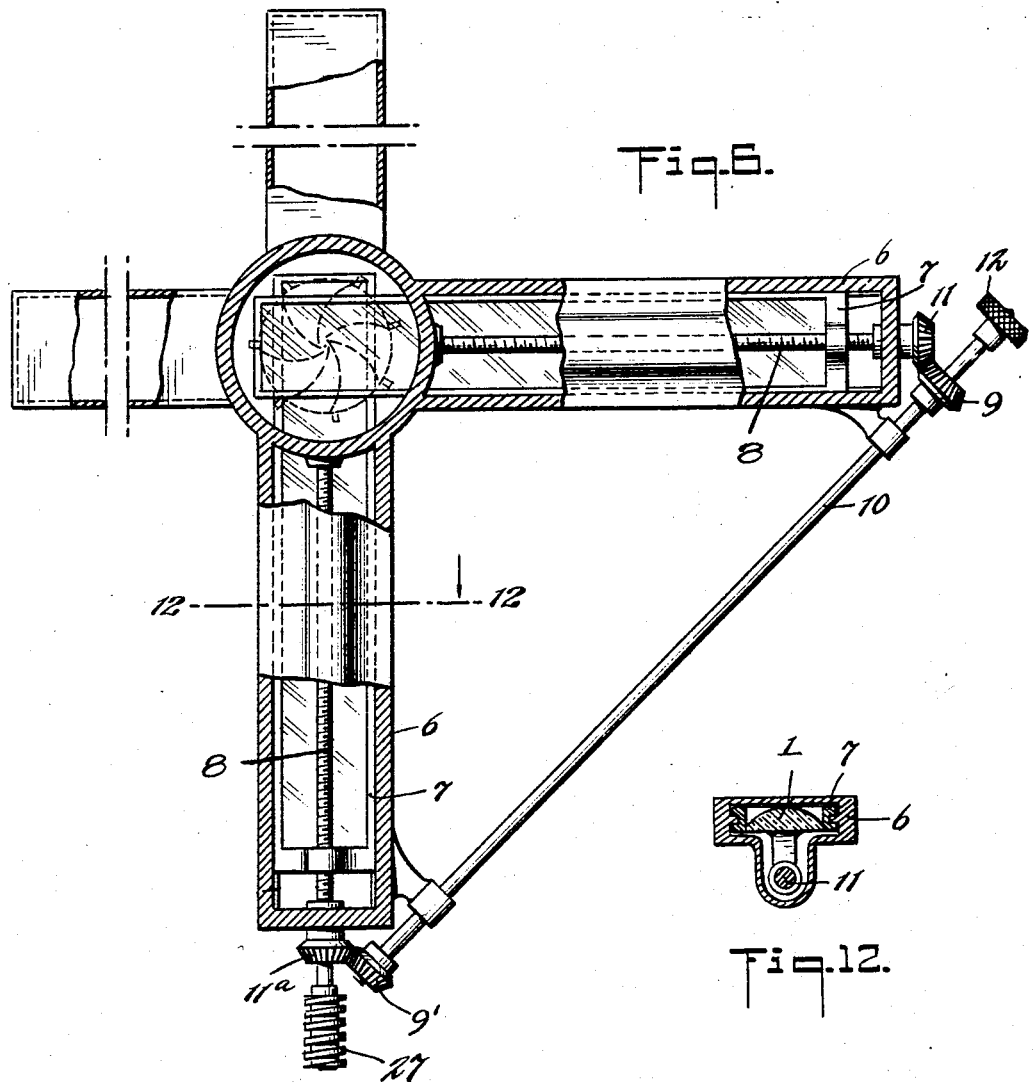
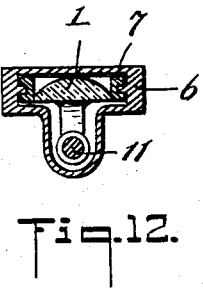
INVENTORS
SIGMUND EILENBERG
GILBERT EILENBERG
BY
Marks & Clerk
ATTORNEY July 29, 1930. S. EILENBERG ET AL 1,771,844
PHOTOGRAPHIC APPARATUS
Filed Oct. 11, 1927  4 Sheets-Sheet 3

INVENTORS
SIGMUND EILENBERG
GILBERT EILENBERG
BY Marks & Clerk.
ATTORNEY

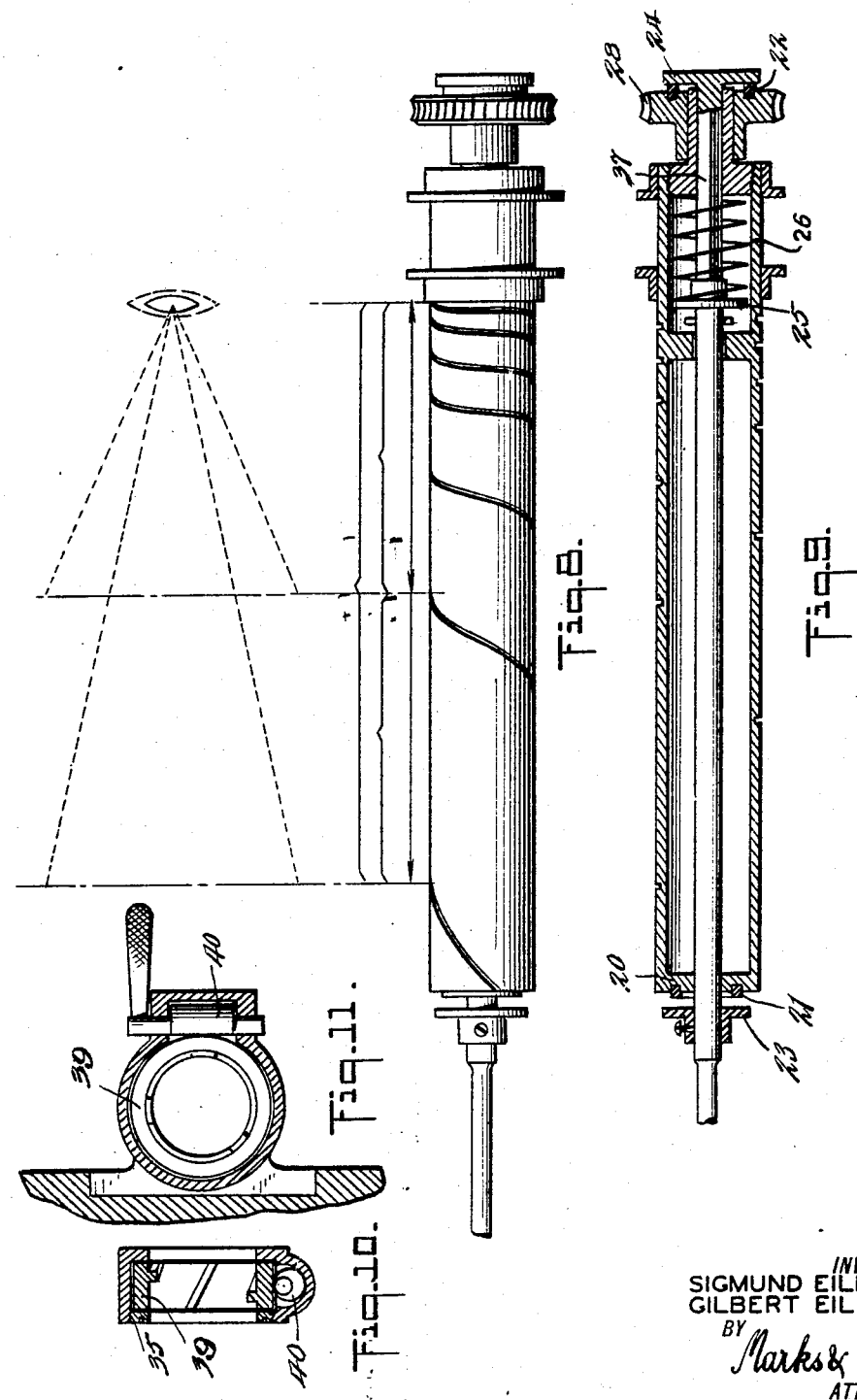

Patented July 29, 1930

1,771,844

UNITED STATES PATENT OFFICE

SIGMUND EILENBERG AND GILBERT EILENBERG, OF BROOKLYN, NEW YORK

PHOTOGRAPHIC APPARATUS

Application filed October 11, 1927. Serial No. 225,452.

This invention relates to the lens system of photographic apparatus.

All such lenses hitherto constructed or suggested have comprised one or more pieces of translucent material each of which was formed with one or more curved surfaces, for instance, a type of lens in common use comprises circular pieces of translucent material having outwardly curving or convex surfaces on both sides.

In known forms of photographic lenses, the curved surfaces on each side of the lens are described from a center lying along the principal axis of the lens, by radii lying in a common plane for "similar points" on each surface.

"Similar points" in this connection is intended to indicate the points at which a line passing perpendicularly through the central vertical plane of the lens at any point would pass through the surface of the front and back faces of the lens.

It is an object of this invention to provide a lens in which the radii describing the curved surfaces of the lens lie in planes at an angle to one another for similar points in the front and back surface of the lens.

The elements of a photographic lens system comprising a plurality of lenses are commonly arranged so that certain of said lenses may be removed in order to obtain lens systems of different characteristics, and the lens so adjusted is worked with until another change is desired when the combination is again altered, the camera or other apparatus being out of use during this change of lens.

It is a further object of this invention to provide a lens in which front and rear surfaces are formed on separate elongated lens elements which are arranged so that one or both may be caused to move with respect to the other whereby a plurality of lenses may be built up thus obviating the necessity for having a number of made-up lenses of different character. Further the waste of time involved in changing lenses is avoided and the camera may be used while the lens is being altered.

A further object of the invention is to provide a lens, the focal length of which may be continuously varied while the camera is in use.

A further feature of the invention is to provide a variable lens of the character described with means for correcting the aberration or inaccuracy in curvature resulting from the slightly different curvature of the lens surfaces at one side of the lens aperture as compared to that of the other.

A further object of the invention is to provide for an automatic regulation of the diaphragm setting on changing the distance between the lens and the plane in which the image is formed, and an automatic regulation of the diaphragm setting in respect to the focal length of the lens system.

A still further object of the invention is to provide means acting to adjust both the lens and the focus of the optical system.

A still further object of the invention is to provide an optical apparatus in which a lens is provided the focal length of which may be continuously altered and means are provided for automatically altering the distance of the lens from the plane in which the image is formed so that the image is formed in the same plane whatever the focal length of the lens.

Still further features of the invention will hereinafter appear.

The invention is herein illustrated and described with respect to one particular embodiment, but it is pointed out that in view of the novel nature of the invention, the described embodiment is to be regarded merely as illustrative and not as in any way limitative of the invention, the scope of which is defined by the appended claims.

Fig. 1 is an elevation of two lens elements placed in such a position as to give an effective lens as shown in Fig. 1ª.

Fig. 3 is a cross sectional view in perspective on the line 3—3 of Fig. 1.

Fig. 4 is a cross sectional view in perspective on the line 4—4 of Fig. 2.

Fig. 5 is a perspective view of one of the lens elements, and 5ª, a view in perspective partly in section of two elements in operative position.

Fig. 6 is a sectional view through the lens mounting.

Fig. 7 is a perspective view of the arrangement of the lens mounting and extension mechanism with iris diaphragm adjustment shown as supplied to a moving picture camera.

Fig. 8 is a diagram illustrating the manner of varying the pitch of the screw cut in the barrel of the extension mechanism.

Fig. 9 is a longitudinal section taken through the extension mechanism.

Figs. 10 and 11 are a section at right angles and on an enlarged scale through the clamp for holding the ring which the diaphragm control rod engages against rotation.

Fig. 12 is a detail view on line 12—12 of Fig. 6.

Similar numerals in the various figures indicate similar parts.

Figure 2:
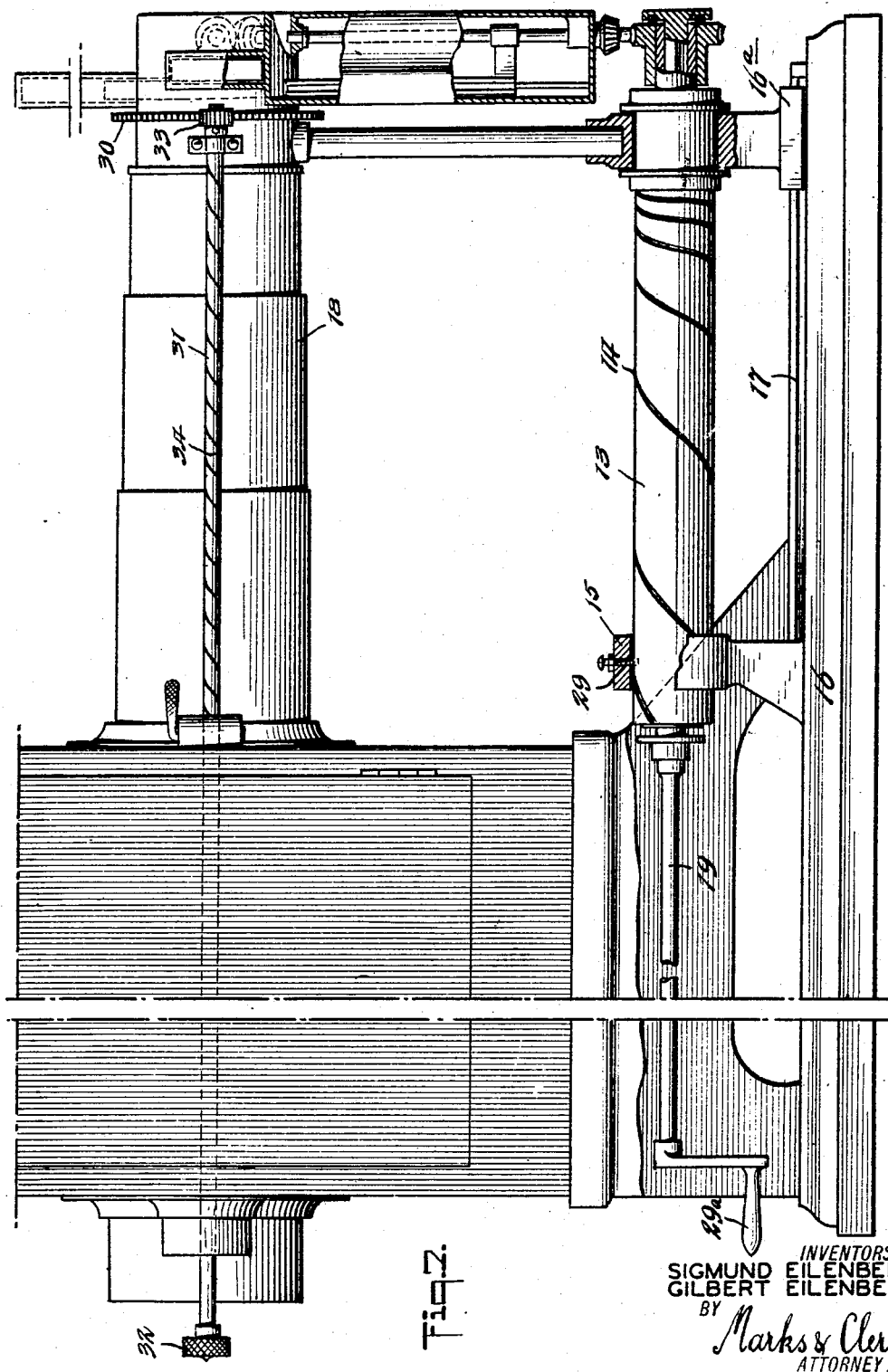
Fig. 2 is a view similar to Fig. 1, but showing the lenses placed together at a point relatively to each other so as to give a lens of different effective curvature as shown in Fig. 2ª.

The invention is described and illustrated with reference to a motion picture camera, since this is a particularly valuable use. In motion picture photography, the range or distance at which the subject is seen being continuously varied. For instance, the first scenes may show a horseman approaching in the distance closely pursued by another. The riders rapidly draw nearer until from being small figures against a back ground of trees on the screen their faces occupy most of the screen. In present day practice said scenes may be taken by taking a plurality of shots at different ranges or by running a camera mounted on a carriage toward the actors, close-ups being taken by running the carriage in the same direction as the riders, such pictures entailing much thought in devising means by which the necessary effect may be obtained.

The same result is obtained by means of this invention by continuously varying the focal length of the lens by which means the image is increased or decreased to give the impression of increase or decrease of distance between the camera and the object. It will be obvious that this is a very important advance in the art.

It will also be obvious that although the lens shown is a double convex one, a double concave lens could be formed equally well or a concavo convex lens could be utilized in forming a complete lens.

The overlying parts of the lenses when made up of two separate lens strips define a quadralateral area considerably larger than the largest diaphragm opening used, and the deviation from true curvature over the diaphragm opening will be very small and may be fully compensated for.

Various practical considerations such as the manner in which the light transmitting characteristics of the surfaces of the lenses facing each other are maintained constant by the inclusion of air or the inclusion of a liquid between said surfaces, the method of maintaining light tight, and dust-proof closure of the lens mounting and the like, are not herein dealt with since these are matters within the ability of mechanics skilled in the art to provide for.

1 indicates one plano-convex lens element and 2, a second such lens element. For the sake of simplicity, the curvature of this lens is shown as identical and as varying uniformly from one end of the lens to the other of the lens element.

The dotted circles indicated at 3 show the portion of the lens exposed by the maximum and minimum diaphragm openings.

4 and 5 are compensating lenses.

The lens mounting as shown in Fig. 6 comprises two housings 6 in which slide the lens mountings 7. These housings guide the lens mountings, and keep the lenses in close contact throughout their movement.

The housings at the lower end are closed by a head having a bore making a light tight fit with a rod 8 held against longitudinal movement relatively to the lens housings 6, and which passes through lugs on the slidable lens mountings 7 so that by rotation of said rod the lens mounting 7 can be displaced longitudinally of the lens housing 6. An equal movement of the two lenses is obtained by arranging a rod 10 carrying mitre gears 9 and 9', engaging corresponding gears 11 and 11ª on the rods 8. The rod 10 may be provided with a crank or hand wheel 12. The lens adjusting mechanism is adapted to act also to vary the position of the lens.

As shown in Fig. 7, the focusing means comprises a barrel 13 having a helical groove 14 turned in its outer surface. The barrel 13 is supported in a bearing ring 15 mounted on the camera base 16, and turning in, but prevented from longitudinal movement with respect to, a second bearing ring 16ª mounted to slide with a guide 17 projecting forwardly from the camera base, which ring 16ª is connected to the telescopic lens tube 18. The drum is rotated by means of a rod 19 which is round and extends through a circular bore in the head 20 at the rear end of the drum and terminates some little distance short of the forward end of the drum. The rod may be clutched to the head 20 by means of projections 21, arranged to take into recesses in a disc 23 on the rod when pushed into the drum. Within the drum at the forward end thereof is a squared rod 37 arranged to slide in a square bore provided in a reduced extension of the cylinder. This squared rod 37 carries a head or abutment 25 at its rear end and at its forward end a clutch disc 24 similar to the clutch disc 23 on the rear end of the rod 19. The clutch disc 24 is adapted to engage projections 22 on the side of a wormwheel 28 mounted to turn freely on the reduced extension of the barrel 13. A spiral spring 26 is arranged between the abutment 25 and the forward end of the barrel and acts to normally hold the disc 24 in engagement with the worm-wheel 28, the rod 19 being of such a length that it is pushed rearwardly by the abutment 25 in this position and the disc 23 thereon disengaged from the projections 21 at the rear of the barrel. As shown in Fig. 6 one of the rods 8 is extended and this extension carries a worm 27 engaging with the worm-wheel 28.

It will be realized that this construction enables the lens to be continuously altered by the turning of the member 12 which will also act to cause rotation of the barrel 13 to vary the distance between the lens and the plane in which the image is formed so that although the image is continuously varied in size, it is maintained in correct focus.

A projecting lug 29 on the ring 15 mounted on the camera base plate takes into the grooves 14 in the surface of the barrel 13. It will be realized that the lenses may be caused to move over one another by the mechanism just described by turning the handwheel 12 which simultaneously adjusts the position of the lens, while the position of the lens may be adjusted without altering the lens structure by pushing the rod 19 forwardly against the resistance of the spring 26 thus clutching the rod 19 to the barrel 13 and disengaging the rod from the lens adjusting mechanism, and turning the rod by the handle 29ª arranged at the back of the camera. The groove 14 in the surface of the barrel 13 is preferably arranged so that the distance the lens mount is moved for each revolution increases in arithmetical progression with a factor of 2, thus accurately correlating a change of focus to a change of lens, the relation being such that a lens adjustment giving double the focal length of the last turns the barrel 13 one complete revolution.

In most motion picture photography work, the focus of the camera is continuously being altered in order to keep the actors and other moving objects in focus irrespective of their movements. This continual change of focus necessitates a high degree of skill on the part of the operators since any failure to focus correctly, of course, blurs the pictures necessitating expensive cut-outs. It is also obvious that this focusing must be effected during the operation of the camera. It will be seen that by providing one handle controlling both the focusing and adjustment of the lenses the operator is enabled to manipulate his camera without any interruption of the operation thereof, the operator's other hand, of course, being occupied in turning the crank.

A further feature of our invention is that the iris diaphragm may be automatically adjusted with changes in focus. To effect this, we furnish the diaphragm mounting with a toothed ring 30 and arrange a rod 31 to extend from the back of the camera where it is furnished with a hand wheel 32 to the front of the camera where it carries a pinion 33, meshing with the toothed ring 30. The rod is held against movement longitudinally of the lens tube except as governed by the bearing member 35 mounted on the side of the camera. To enable the diaphragm to be adjusted automatically by the movement of the lens tube, a thread 34 is turned in the exterior surface of the rod and this groove engages a projection on the inner surface of a ring 39 rotating within the abutment 35. The ring may be held against rotation by any suitable means when desired as for instance, by an eccentrically mounted locking pin 40, and when so held and the rod is moved longitudinally through said ring, it is rotated by the pin engaging in the groove and thereby rotates the diaphragm ring.

It will be realized that the invention provides a valuable means of controlling the lens system of optical apparatus and is particularly valuable in connection with motion picture photography in that a variety of effects is obtainable without the necessity of stopping the operation of the camera in order to change the lens and without in any way interfering with the operation of the camera.

The invention has been briefly described and illustrated with reference to a particular arrangement of lenses and a particular lens mounting, but it will be realized that a number of variations of the described arrangements may be effected by those skilled in the art, and the invention is not limited in any way by the described embodiment, but only by the scope of the claims appended hereto.

We claim:

1. A photographic apparatus with a lens-system, comprising a plurality of cylindrical lens elements varying from one end to another and arranged in guides at an angle to one another, means for causing simultaneous movement of said lens elements relatively to one another along their respective longitudinal axes, and a single operating member for operation of said means.

2. A photographic apparatus with a lens-system, comprising a plurality of cylindrical lens elements varying from one end to another and movable along their longitudinal axes, a number of lens elements acting to compensate spherical variations of the movable lens elements in the effective lens system, means for causing simultaneous movement of said movable lens elements relatively to one another along their respective longitudinal axes, and a single operating member for operation of said means.

3. A photographic apparatus with a lens-system, comprising a plurality of cylindrical and movable lens elements varying from one end to another and arranged with their longitudinal axes at an angle to one another, a number of lens elements acting to compensate spherical variations of the movable lens elements in the effective lens system, means for causing simultaneous movement of said movable lens elements relatively to one another along their longitudinal axes, and diaphragm mechanism for effecting automatic and independent relative adjustment of the diaphragm setting with respect to the various focal lengths of the effective lens system by being operable simultaneously with the movement imparted to said movable lens elements or independently thereof.

4. A photographic apparatus with a lens-system, comprising a plurality of cylindrical lens elements varying from one end to another and movable along their longitudinal axes, a number of lens elements acting to compensate spherical variations of the movable lens elements in the effective lens system, mechanism for causing simultaneous transverse movement of the movable lens elements relatively to one another along their respective longitudinal axes, mechanism for varying the distance of the lens system toward or from the plane in which the image is formed, and means for causing simultaneous actuation of both mechanisms to effect relative adjustment of the distance between the lens system and the plane in which the image is formed with respect to the various focal lengths of the effective lens system due to the transverse movement of the movable lens elements along their longitudinal axes, said means providing independent actuation of said mechanisms.

5. A photographic apparatus with a lens-system, comprising a plurality of cylindrical lenses varying from one end to the other and arranged in a superimposed crosswise relation, a number of lens elements acting to compensate spherical variations of the movable lens elements in the effective lens system, means for causing simultaneous transverse movement of the first mentioned lenses relatively to one another along their respective longitudinal axes, diaphragm means for controlling the diaphragm setting of said lens system, and mechanism for varying the distance of the lens system toward and from the plane in which the image is formed.

6. A photographic apparatus with a lens-system, comprising a plurality of cylindrical lens elements varying from one end to the other and arranged in a superimposed crosswise relation, a number of lens elements acting to compensate spherical variations of the movable lens system in the effective lens system, means for moving said first mentioned lens elements simultaneously relatively to one another along their longitudinal axes, means for varying the distance between the lens system and the plane in which the image is formed, and diaphragm mechanism for effecting automatic and independent relative adjustment of the diaphragm setting with respect to the various focal lengths of said lens system due to the movement of the movable lens elements along their longitudinal axes by being operable simultaneously with the movement imparted to said movable lens elements or independently thereof.

7. A photographic apparatus with a lens-system, comprising a plurality of cylindrical lens elements varying from one end to the other and arranged in a superimposed crosswise relation, a number of lens elements acting to compensate spherical variations of the movable lens elements in the effective lens system, means for moving said first mentioned lens elements relatively to one another along their respectively longitudinal axes, means for varying the distance of the lens system toward or from the plane in which the image is formed, and diaphragm means for effecting automatic and independent relative adjustment of the lens system aperture with respect to the varying distances between the lens system and the plane in which the image is formed by being operable simultaneously with the means for varying the distance between the lens system and the plane in which the image is formed, or independently thereof.

8. A photographic apparatus as claimed in claim 5, wherein the means causing simultaneous transverse movement of the first mentioned lens elements, the diaphragm means, and the means for controlling the distance between the lens system and the focal plane are all connected by mechanism effecting independent and simultaneous adjustment of said means relatively to each other.

9. A photographic apparatus as claimed in claim 5, in which the means acting to move the lens system toward or from the focal plane includes a cylindrical member having a groove arranged so that the distance said lens system is moved for each revolution increases in arithmetical progression with a factor of 2.

In testimony whereof we affix our signatures.

SIGMUND EILENBERG.
GILBERT EILENBERG.